United States Patent

[11] 3,613,108

[72] Inventor Dieter Spannhake
Darmstadt, Germany

[21] Appl. No. 849,604
[22] Filed Aug. 8, 1969
[45] Patented Oct. 12, 1971
[73] Assignee Fernseh G.m.b.H.
Darmstadt, Germany
[32] Priority Feb. 9, 1967
[33] Germany
[31] F 51474
Continuation of application Ser. No. 702,647, Feb. 2, 1968. This application Aug. 8, 1969, Ser. No. 849,604

[54] CIRCUIT FOR GENERATING CONVERGENCE COIL CURRENTS
4 Claims, 5 Drawing Figs.

[52] U.S. Cl. 315/13 C, 315/27 GD
[51] Int. Cl. H01j 29/50
[50] Field of Search 315/13 C, 27 GDC, 27 SR

[56] References Cited

UNITED STATES PATENTS

| | | | |
|---|---|---|---|
| 2,679,614 | 5/1954 | Friend | 315/13 (C) |
| 2,682,012 | 6/1954 | Lockhart | 315/27 GDC |
| 2,700,742 | 1/1955 | Friend | 315/27 GDC |
| 3,258,643 | 6/1966 | Lemke | 315/13 C |

FOREIGN PATENTS

| | | | |
|---|---|---|---|
| 1,227,172 | 2/1960 | France | 315/13 C |

*Primary Examiner*—Malcolm F. Hubler

ABSTRACT: The horizontal frequency sawtooth currents modulated by vertical frequency sawtooth currents which are desirable for use in the green and red convergence coils in order to make the respective scanned areas coincide are derived from horizontal sawtooth voltages modulated by vertical sawtooth voltages which exist in a distortion-compensating generator in the vertical deflection circuit, by feeding said voltages into respective ADD amplifiers whose current outputs are proportional to their respective voltage inputs. Further, horizontal frequency parabolic and sawtooth voltages are also applied at each ADD amplifier input, causing them to be added to the above-mentioned modulated voltages. The outputs of the ADD amplifiers are connected to the respective convergence coils.

Inventor:
Dieter Spannhake by Michael S. Striker
Attorney

Inventor:
Dieter Spannhake by Michael S. Striker
Attorney

Inventor:
Dieter Spannhake
by

Attorney

CIRCUIT FOR GENERATING CONVERGENCE COIL CURRENTS

This is a continuation of application Ser. No. 702,647, filed Feb. 2, 1968.

BACKGROUND OF THE INVENTION

This invention relates to color television receivers, and in particular to color television receivers having cathode-ray tubes with a three-beam system and a luminous screen. In such receivers, it is of course required that the three cathode-ray beams converge at one point on the screen. This requires a relatively complicated system for the deflection of said beams. First, the deflection currents for the horizontal and vertical deflection coils must be generated in a particular fashion. Secondly, a so-called convergence coil system, which feeds three pole pieces and permits deflection of the electron beams corresponding to red, blue and green, in a radial direction, must be suitably energized.

In general, the surface of the screen is spherical with a radius of curvature which is substantially larger than the distance between the deflection center and the screen. This causes a so-called "pincushion " distortion to occur if the electron beams are deflected in the horizontal and vertical direction by deflection currents which are linear with respect to time. This "pincushion" distortion must be corrected by means of a dynamic modulation, that is a modulation which depends on the angle of deflection.

Furthermore, a convergence error occurs among the three beams for different values of deflection angle, due to the fact that the three beam systems have a relative translation from the axis of the cathode-ray tube. This causes the three beams to converge in a plane other than the screen, or possibly not to converge at all. Such a convergence error may lead to considerable color distortion. It is relatively simple to eliminate in the middle of the image filed by energizing the convergence coils with suitable vertical and horizontal deflection current which are additively superimposed upon each other. However, in the corners of the scanned fields the convergence error increases and color fringes appear at the edges of the reproduced images.

The conditions for optimum coincidence of the scanned areas to the edges of the image fields have been thoroughly investigated for cathode-ray tubes with 90° deflection angles. It was found that the optimum coincidence of the scanned areas occurs if horizontal (line) sawtooth currents having a vertical (frame) frequency sawtooth modulation are used to energize the red and green convergence coils.

Until now, these optimum currents were not used since the equipment required seemed excessive for commercial receivers. It was assumed that for generation of these currents a generator for horizontal as well as vertical deflection currents and a modulator for modulating the former by the latter would be required.

SUMMARY OF THE INVENTION

It is the object of this invention to disclose a simple circuit for furnishing the optimum correction currents for the red and green convergence coils and thus permit their use in commercial television receivers.

This invention thus comprises a system for furnishing the optimum converge coil currents to a first and second set of convergence coil, respectively corresponding to a first and second color in a color television receiver. This receiver also has a distortion-compensating generator adapted to generate a horizontal frequency sawtooth voltage modulated by a vertical frequency sawtooth voltage in the vertical deflection system. The system comprises a first and second current-generating circuit respectively adapted to generate a first and second output current proportional to a first and second input voltage. It also comprises means for connecting the output of said compensation voltage generator to the respective inputs of said current-generating circuits, in such a manner that the input voltage of said first current generating circuit has a predetermined phase relationship to the input voltage of said second current-generating circuit. Said first and second output currents are then caused to flow in said first and second set of convergence coils respectively.

The novel features which are considered as characteristics for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
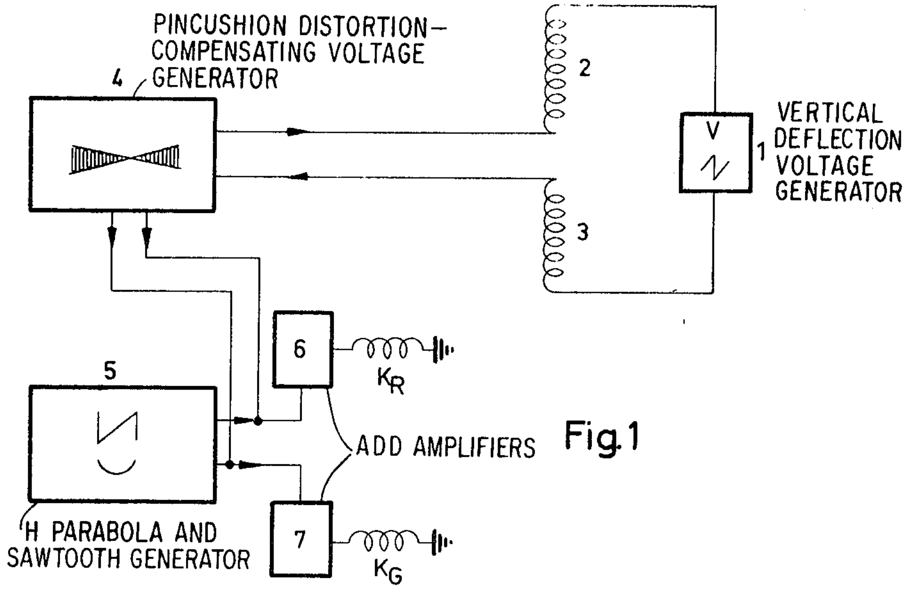
FIG. 1 is a block diagram of a convergence current generating circuit according to this invention.

Referring first to FIG. 1, reference numeral 1 denotes a vertical deflection voltage generator which feeds the vertical deflection coils 2 and 3. A distortion-compensating voltage generator 4, which is adapted to generate a voltage for compensation of the "pincushion" distortion is inserted in series between coils 2 and 3. This distortion-compensating voltage generator is adapted to generate a sawtooth voltage of horizontal frequency which is modulated by a sawtooth voltage of vertical frequency. The resulting waveform is shown in the block numbered 4 in FIG. 1. Convergence coils for the colors red, green and blue are provided at the neck of the cathode-ray tube. In FIG. 1 only the coils corresponding to red and green, $K_R$ and $K_G$ respectively, are shown. These coils are generally supplied with parabolic and sawtooth currents of horizontal frequency generated in stage 5. In accordance with this invention, an improvement in the convergence results, if the currents at the outputs of stages 6 and 7 respectively, namely the currents in convergence coils for red and green respectively, have an additional component which is derived from distortion-compensating voltage generator 4 and has a horizontal frequency sawtooth waveform which is modulated by a vertical frequency sawtooth waveform. The phase relationship between this additional current component in the red and green convergence coils respectively will be discussed below. The stages 6 and 7 are preferably embodied as ADD amplifiers.

Figure 2:
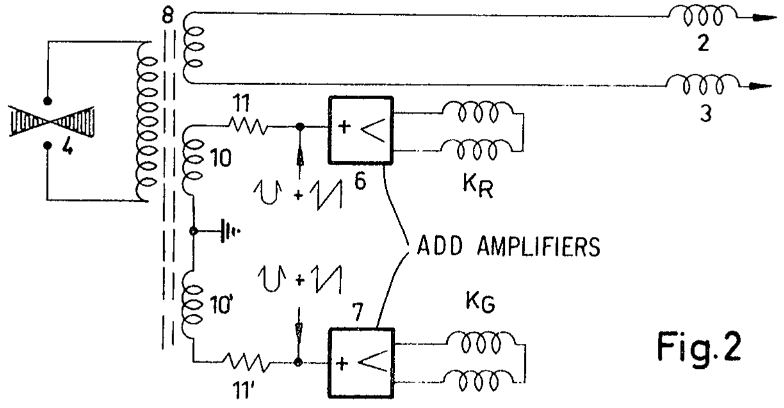
FIG. 2 is a schematic embodiment of the block diagram of FIG. 1.
Figure 3:
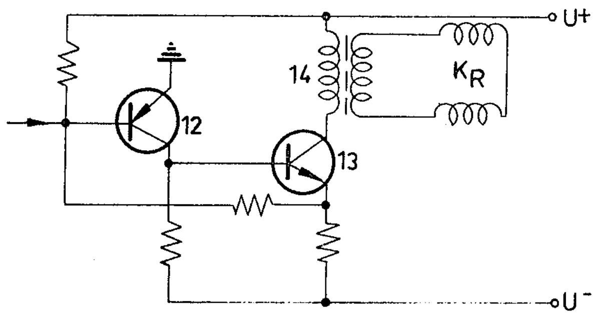
FIG. 3 is an amplifier for use in the circuit according to this invention.

FIG. 2 shows a transformer 8, whose primary is connnected to the output of the distortion-compensating voltage generator 4. Secondaries 10 and 10′ of transformer 8 are respectively applied to ADD amplifiers 6 and 7 by means of resistors 11 and 11′. As before, ADD amplifiers 6 and 7 respectively feed convergence coils $K_R$ and $K_G$. Parabolic and sawtooth horizontal frequency correction voltages as furnished by stage 5 of FIG. 1 are applied to the inputs of ADD amplifiers 6 and 7. In order to cause the input impedance of ADD amplifiers 6 and 7 respectively to have as low a value as possible, a circuit according to FIG. 3 may be used. Here the base of an NPN transistor 13 is connected to the collector of a PNP transistor 12 whose emitter is connected to ground and whose base is adapted to receive the input voltages described above in relation to FIG. 2. The voltage appearing at the emitter of transistor 13 is coupled back to the base of transistor 12. The convergence coils, in FIG. 3 the red convergence coils $K_R$, are fed by means of transformer 14 connnected between the collector of transistor 13 and the positive supply voltage $U^+$. The green convergence coils $K_G$ are energized in a similar manner, but the distortion-compensating voltage furnished to this circuit may be of opposite phase as will be discussed below.

Figure 4:
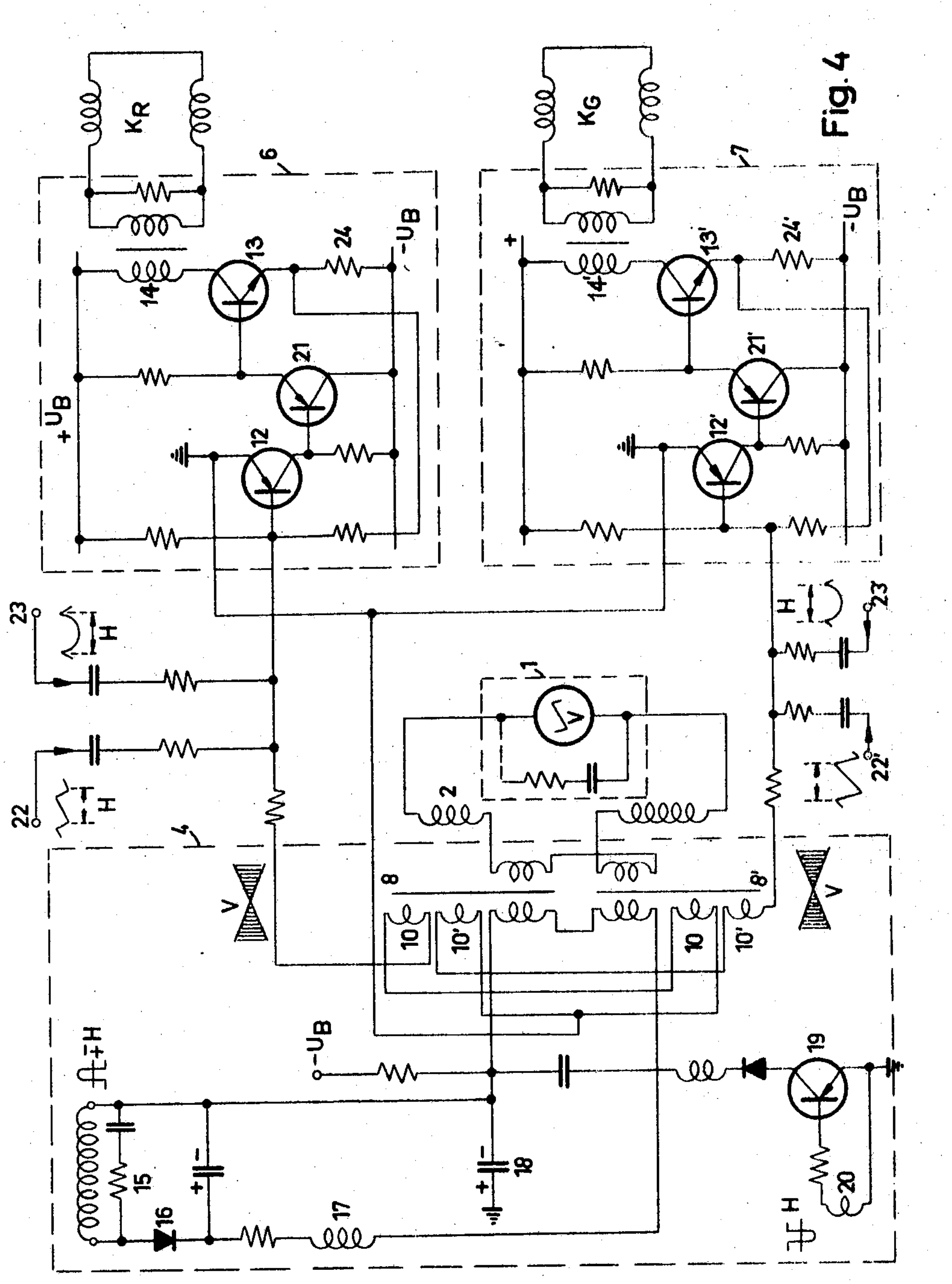
FIG. 4 is a complete schematic diagram.

FIG. 4 is a complete circuit diagram of the circuit for feeding the red and green convergence coils according to this invention. The circuits indicated in block form in FIGS. 1 and 2 are shown here in detail. Reference numerals for the same circuit elements are the same throughout the Figures.

Reference numeral 1 again indicates the vertical deflection voltage generator for supplying the vertical deflection coils 2 and 3. The circuit indicated with reference numeral 4 consists of a conventional "pincushion" distortion-compensating generator for the vertical deflection system. Circuits 6 and 7 are the ADD amplifiers which supply the correction current for convergence coils $K_R$ and $K_G$ respectively.

"Pincushion" distortion compensation in the vertical deflection coils is effected in a conventional manner by adding a correction voltage of horizontal frequency which is modulated by a vertical frequency modulation. As shown above in FIG. 2, this modulation is accomplished by use of a transformer 8 whose secondary windings are connected into the circuit of the deflection coils 2 and 3. In the example shown here two transformers are used which are energized with opposite polarity by the vertical frequency correction voltages. Also present within the distortion-compensating voltage generator 4 is a transistor 19 which is furnished with a pulse of horizontal frequency via the winding 20. It is energized by means of a negative voltage power supply source $-U_B$. Capacitor 18 serves as a storage capacitor. Reference numeral 15 denotes one winding of the horizontal deflection circuit transformer. This furnishes an alternating pulse voltage of horizontal frequency, which is rectified by means of diode 16. Inductor 17 has a high impedance for alternating current voltages, that is it decouples the horizontal frequency voltage from the power supply source. The direct current voltage derived from the network consisting of elements 15, 16, 17 and 18 serves solely to effect the premagnetization of the two transformers 8 and 8'.

In accordance with this invention, the voltages derived from distortion-compensating voltage generator 4 are then combined with horizontal frequency sawtooth and parabolic correction voltages and converted to corresponding currents, which in turn are used to energize the red and green convergence coils. For this purpose, the modulation voltages are derived by means of windings 10 and 10' of transformers 8 and 8' respectively. The waveforms existing at resistors 11 and 11' respectively are indicated on the oscillograms shown on the Figure. The voltage derived from the coil 10 is fed to transistor 12 by means of the aforementioned resistor for use in the green convergence coils, while the voltage derived from coil 10' is fed to transistor 12' by means of resistor 11'. Terminals 22 and 23, and 22' and 23' respectively introduce sawtooth and parabolic correction voltages of horizontal frequency to the bases of transistors 12 and 12'.

ADD amplifiers 6 and 7 consist of input transistors 12 and 12' respectively followed by an emitter follower stage 21 and 21' respectively and an output stage 14 and 14' respectively. A voltage derived from emitter resistances 24 and 24' is respectively fed back to the bases of transistors 12 and 12'. In this way, a strict proportionality between the current in the output transistor, and thus in the convergence coil system, and the input voltage is achieved. A conversion of the input voltages into additive currents in the output circuits $K_R$ and $K_G$ respectively, as desired, results.

In the circuit arrangement shown in FIG. 4, the transformer windings 10 and 10' which furnish the vertical "pincushion" distortion-compensating voltages are fed to transistors 12 and 12' respectively in opposite polarity. This is appropriate for correcting convergence errors at the upper and lower image edges. However, the arrangement according to this invention may also be used for correcting red and green errors at the left and right edges of the scanned images. In order to accomplish this latter correction, the correction system is fed not only signals of equal size and opposite polarity, but also signals of equal magnitude and same polarity. This may be accomplished by feeding the two modulation signals derived from the two transformers with opposite polarity to two potentiometers connected in series, whose variable arms may be simultaneously translated in the same direction, and then feeding the voltages appearing at these variable arms to two potentiometers which are connected in parallel but in opposition, and also have mechanically coupled variable arms which may be simultaneously adjusted in the same direction. If the voltage derived from the latter potentiometers is fed to the ADD amplifiers 6 and 7 respectively, adjustment of the first potentiometer pair will accomplish the correction relative to the side edges, and adjustment of the second potentiometer pair will accomplish the adjustment for the upper and lower image edges. This type of adjustment is extremely convenient and saves a greater number of independent potentiometers which were required up to now.

Figure 5:
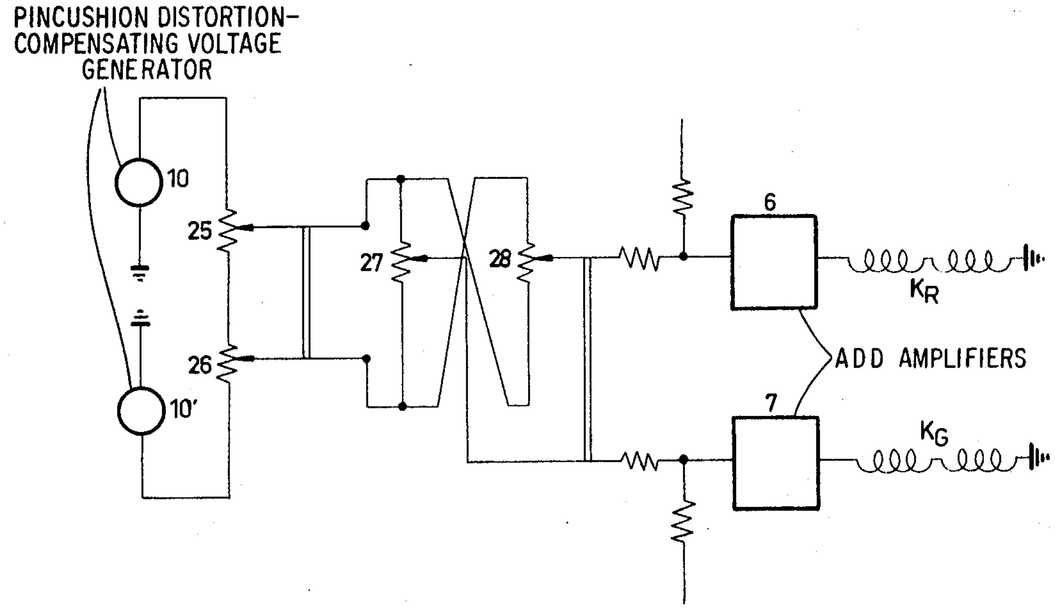
FIG. 5 is a potentiometer arrangement for adjustment of the convergence currents.

The potentiometer arrangement described above will be explained with reference to FIG. 5. Here reference numerals 10 and 10' respectively denote the voltage source for the vertical "pincushion" distortion-compensating voltage of opposite polarity corresponding to windings 10 and 10' of transformer 8 and 8' in FIG. 4. These voltages are fed to potentiometers 25 and 26 which are connected in series. The variable arms of these potentiometers in turn feed the parallel arrangement of potentiometers 27 and 28. The latter, as shown in the Figure, are connected in a phase opposition arrangement. The variable arms of the second pair of potentiometers are also mechanically coupled one to the other. The voltages appearing at the variable arms of potentiometers 27 and 28 respectively are fed to ADD amplifiers 6 and 7 respectively which in turn supply current to convergence coils $K_R$ and $K_G$.

While the invention has been illustrated and described as embodied in a particular type of voltage-current conversion circuit, it is not intended to be limited to the details shown, since various modifications and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

1. In a color television receiver having a first and second set of convergence coils respectively corresponding to a first and second color, and a pincushion distortion compensating voltage generator adapted to generate a horizontal frequency sawtooth voltage in the vertical deflection circuit, a convergence correction system for causing the scanned areas corresponding to said first and second color to coincide, comprising, in combination, a first and second summing amplifier, respectively having a first and second output stage, respectively adapted to convert a first and second input voltage into a first and second output current each substantially proportional to the corresponding input voltage, said first and second output current flowing, respectively, in said first and second output stage; means for connecting the output of said pincushion distortion compensating voltage generator to the respective inputs of said summing amplifiers, said means comprising a first and second potentiometer, series connected, and connected across the output of said pincushion distortion compensating voltage generator, having a first and second variable arm respectively, said first and second variable arm being mechanically coupled to each other, and a first and second additional potentiometer, connected in parallel, in phase-opposition, from said first variable arm to said second variable arm, said first additional potentiometer having a variable arm connected to said first summing amplifier input, said second additional potentiometer having a variable arm connected to said second summing amplifier input, the variable arms of said first and second additional potentiometers being mechanically intercoupled; and second means for interconnecting said first set of convergence coils and said first output stage, and said second set of convergence coils and said second output stage in such a manner that said first output current flows through said first set of convergence coils and said secone output current flows through said second set of convergence coils.

2. In a color television receiver having a first and second set of convergence coils respectively, corresponding to a first and second color, and a pincushion distortion compensating voltage generator adapted to generate a horizontal frequency sawtooth voltage modulated by a vertical frequency sawtooth voltage in the vertical deflection circuit, a convergence correction system for causing the scanned areas corresponding to said first and second color to coincide, comprising, in combination, a first and second summing amplifier, respectively having a first and second output stage, respectively adapted to convert a first and second input voltage into a first and second output current each substantially proportional to the corresponding input voltage, said first and second output current flowing, respectively, in said first and second output stage; means for connecting the output of said pincushion distortion compensating voltage generator to the respective inputs of said summing amplifiers, in such a manner that the input voltage of said first summing amplifier; is in phase with the input voltage to said second summing amplifier; and means for interconnecting said first set of convergence coils and said first output stage, and said second set of convergence coils and said second output stage in such a manner that said first output current flows through said first set of convergence coils and said second output current flows through said second set of convergence coils.

3. A system as set forth in claim 2, further comprising additional connecting means connecting the output of said pincushion distortion compensating voltage generator to the respective inputs of said summing amplifiers in such a manner that the input voltage of said first summing amplifier is in phase opposition to the input voltage of said second summing amplifier.

4. A system as set forth in claim 3, wherein said first and second summing amplifier have a first and second output emitter voltage respectively and a first and second input respectively; and means for coupling said first emitter voltage to said first input and said second emitter voltage to said second input.